Oct. 23, 1962 J. MÜLLER 3,060,105
CONCENTRATION OF HYDROGEN PEROXIDE
Filed July 15, 1957
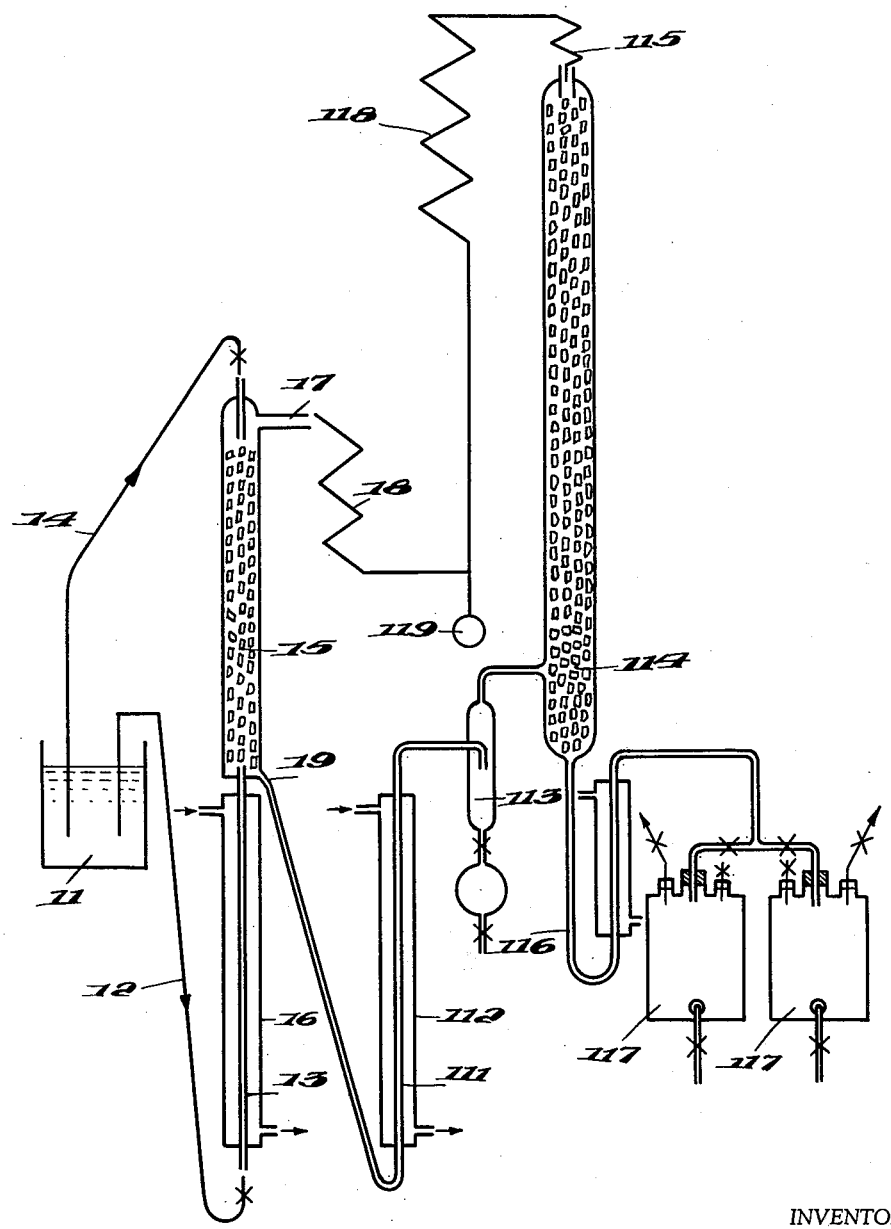
INVENTOR
JOSEF MÜLLER,
BY *Bailey, Stephens & Huettig*
ATTORNEYS

3,060,105
CONCENTRATION OF HYDROGEN PEROXIDE
Josef Müller, Rheinfelden, Germany, assignor to Deutsche Gold- und Silber-Scheideanstalt vormals Roessler, Frankfurt, Germany
Filed July 15, 1957, Ser. No. 671,856
Claims priority, application Germany July 20, 1956
5 Claims. (Cl. 202—40)

The present invention relates to an improved process for the concentration of hydrogen peroxide, even up to 100%, from dilute aqueous solutions in a simple and undangerous manner.

In the production of highly concentrated hydrogen peroxide according to known processes dilute hydrogen peroxide of about 30 to 35% concentration is continuously or discontinuously evaporated under vacuum. The pure vapor is then rectified and in order to increase the concentration heat has also been supplied to the rectification or in connection with such rectification. Another method has also become known in which the peroxide solution is totally evaporated one or more times and the resulting vapors then fractionated to obtain the desired concentration. All of these proposed processes have the disadvantage that the solutions which have already been brought up to a high concentration must be subjected to a further heating or vaporization in order to increase the concentration. This leads to the danger of losses by decomposition and furthermore the handling of concentrated hot peroxide solutions in larger quantities is not without danger.

According to the invention it was found that these difficulties could be avoided in that solutions with a concentration of over 70% or 75% are concentrated only by a regulated rectification as the last step without rendering it necessary to heat or vaporize the highly concentrated products again. According to the invention, dilute solutions preferably with a hydrogen peroxide content of about 35–45% by weight and lower are first partially vaporized, preferably in a climbing evaporator, and the resulting vapors are then passed through a dephlegmator connected to the evaporator and contacted therein countercurrently with a solution of the same hydrogen peroxide concentration as the starting peroxide solution. Advantageously the same peroxide solution is supplied partly to the evaporator and partly to the dephlegmator in a predetermined ratio as will be more fully described below. In this way, heat is saved as the reflux is not provided as heretofore by cooling but rather by the fresh starting solution which is concentrated thereby. An already preconcentrated peroxide solution is then withdrawn from the dephlegmator and totally vaporized in a second step in an evaporator. The vapors of this step are then passed with high concentration directly to a rectification column in which they are fractionally condensed to the desired concentration with the aid of regulatable cooling provided at the head of the column. The highly concentrated product is then directly collected in storage containers without it being necessary that it again undergo heating.

A separator is provided between the evaporator of the second step, in which total vaporization takes place, and the fractionating column, in which residues and impurities collect. In continuous operation of the process this separator must be emptied from time to time.

The concentration of the product of the first step which is supplied to the total vaporization step depends upon the extent of the partial vaporization or respectively the amount of the fresh solution supplied to the dephlegmator or reflux. It is consequently possible to regulate the concentration to a great degree by regulation of the reflux ratio and also thereby regulate the concentration effect for the final product. With a reflux ratio of 0.25 to 0.30 one, for example, obtains a maximum concentration of 93 to 95% by weight in the condensation product of the fractionating column. The concentration attained in the solution which is supplied to the total vaporization in the second step is about 70 to 75%. When final concentrations of only 80 or 85% are desired, it suffices when the concentration of the solution supplied to the total vaporization is only 55 to 45% by weight and this is easily attained by adjusting the reflux ratio to 1.5 to 1.0.

The smooth progress of the process according to the invention and especially the total yield obtained depends considerably upon the proper carrying out of the total vaporization in the second step. It was found that the proper selection of the material for the construction of the evaporator for the second step is of considerable advantage. It was found that use of an oxidized tantalum tube for such evaporator gave especially good results. While an anodically oxidized aluminum tube also could be used, its life is not as long as that of the oxidized tantalum. The oxidation of the tantalum (which does not form a part of the present invention) can be effected thermally but is better effected electrolytically by anodic oxidation in sulfuric acid. The anodic oxidation is carried out until full blocking is effected so that with a voltage of 50 volts practically no passage of electric current can be detected. It was found that tantalum without such oxidation treatment is not entirely stable against concentrated hydrogen peroxide solutions and causes a discoloration of the concentrates, especially when the surface has not been polished. The anodic oxidation therefore replaces a special mechanical preparation of the tantalum surface.

In order to hinder the passing over of volatile acids during the total vaporization and also in order to provide a proper consistency of the residue, it is advisable to add sodium pyrophosphate to the starting solution until it is neutral to methyl orange. The residue obtained in the total vaporization separates out as a viscous paste so that the danger of clogging is avoided. When aluminum is employed in the apparatus, a small quantity of ammonium nitrate, for example, about 0.1–0.3 g./l., can be added to the starting solution to protect the aluminum.

The process according to the invention, in which the necessary concentration of the starting solution is effected before the total vaporization so that upon rectification of the vapor a pure highly concentrated product is obtained directly, is therefore characterized in that the direct supply of heat is limited to concentrations at which such supply of heat is still well tolerated. Furthermore, the concentration is effected continuously in such a way that the presence of larger quantities of concentrated and hot peroxide are avoided in the apparatus. Consequently the dangers of handling hot concentrated solutions are reduced to a minimum.

The process according to the invention is also well suited for the treatment of hydrogen peroxide solutions contaminated with organic components, such as, for example, are obtained with the known anthraquinone process. The volatile organic components are driven off over the head during the concentration, whereas the non-volatile organic and inorganic components are separated out during the total vaporization so that a very pure concentrate is obtained.

As the starting solution is employed as reflux during the concentration and the purity of the concentrated product is obtained in a single total vaporization, the process according to the invention also is very economical to use with relatively dilute starting solutions.

The accompanying drawing diagrammatically shows an apparatus suitable for carrying out the process according to the invention.

Referring to the drawing, storage vessel 11, for example, contains a 35% hydrogen peroxide solution. Depending upon the desired reflux ratio, a portion of such solution is supplied to evaporator 13 over conduit 12 and another portion to dephlegmator 15 over conduit 14. Evaporator 13 is heated with steam jacket 16 and vapors produced pass into dephlegmator 15 in which they are passed countercurrently to the liquid solution supplied over conduit 14. The excess steam leaves the head of the dephlegmator at 17. When hydrogen peroxide is carried along with such excess steam this can be returned in dilute form to the hydrogen peroxide production. A more concentrated hydrogen peroxide solution runs out of the bottom of dephlegmator 15 at 19, preferably over an overflow sill, and is supplied to the total evaporator 111 of the second step. The total evaporator 111 is also heated with a steam jacket 112. The vapors leaving the total evaporator 111 are passed through separator 113 in which the impurities are retained and then introduced into rectification column 114 which is provided at its upper end with a reflux cooler 115. The reflux cooler serves to regulate the condensation and is adjusted to provide the desired concentration in the final product. The concentrate is drawn off over a cooled siphon 116 and collected and stored in vessels 117. The excess vapors from column 114 are condensed in cooler 118. Coolers 18 and 118 are connected to vacuum pump 119. In order to prevent any contamination and decompositoin of the highly concentrated solution, column 114 is preferably constructed of glass and is filled with glass rings or other inert filling bodies. Pure aluminum or oxidized tantalum can also be used for such column, but the latter hardly comes into consideration because of its price.

The following examples will serve to illustrate several embodiments of the process according to the invention:

Example 1

10 to 12 liters per hour of a 35% hydrogen peroxide solution were concentrated in an apparatus according to the drawing in which the heating tubes of the evaporator were 2 meters long with a 20 mm. interior diameter. The quantity of fresh hydrogen peroxide solution supplied to the top of the dephlegmator was such that a reflux ratio of 0.30 was provided. The apparatus was operated under a pressure of 30–60 mm. Hg and the steam employed to heat the evaporator tubes was 0.1 atmosphere gauge pressure. The temperature reached in the first evaporation step was 55–65° C. and the concentration of the liquid peroxide supplied from the dephlegmator to the second evaporator in which total evaporation was effected was 75% by weight. The temperature reached in the second evaporation was 60–70° C. and upon condensation of the vapors from the total evaporation a product of 93–95% by weight of hydrogen peroxide was obtained. The yield was 98–99% and the highly concentrated product was of very good stability.

As will be seen from the following examples, the process according to the invention is also suited for the purification and concentration of rather dilute hydrogen peroxide solutions, such as are produced chemically by organic processes without use of electric current, for example, by the auto oxidation of an anthrahydroquinone in an organic solvent mixture and followed by water extraction. These solutions in addition to $H_2O_2$ contain organic compounds and impurities derived from the organic solution which must be removed when such solutions are worked up and concentrated. Particularly, a purification operation is necessary in order to be able to produce highly concentrated hydrogen peroxide therefrom. In the process according to the invention the volatile organic impurities and excess water are stripped off in the first concentration step while the non-volatile impurities are separated off in the following total vaporization.

Example 2

An aqueous extract obtained from the anthraquinone process containing 9.95 g. $H_2O_2$ per 100 cc. was neutralized to methyl orange with sodium pyrophosphate and was partly supplied to the heating tube of the first evaporator in an apparatus such as shown in the drawings and partly to the top of the dephlegmator to provide a reflux ratio of 0.41. 58% of the volume of the solution was driven off in the first step. The volatile organic impurities were removed with the steam and 2% of the $H_2O_2$ cotnained in the original solution were also entrained therewith. The concentrate running out of the dephlegmator contained about 23 g. $H_2O_2$ per 100 cc. Upon total evaporation thereof in the second step, a pure product of 53% by weight of $H_2O_2$ in 14.5% of the original volume of the solution was recovered in the rectification column. The remaining 27.5% of the volume of the original solution passed over the head of the rectifying column and was condensed. About 1% of the hydrogen peroxide supplied in the original solution remained in the residue of the total vaporization and this can be recovered by blowing out the residue with steam. The total yield was about 99%. The apparatus was operated under the pressure of 30–60 mm. Hg and the pressure of the treating stream was 0.1 atmosphere gauge pressure. Both the product driven off at the head of the dephlegmator of the first step and the product recovered from the head of the rectification column were returned to the extraction process employed to obtain the aqueous $H_2O_2$ extract employed as starting solution. The organic compounds contained therein oppose solution of further quantities or organic compounds and the small quantities of $H_2O_2$ contained therein are retained. The concentrated product obtained in the rectification column was colorless and almost odorless. It was of good stability without addition of stabilizers and on 9 weeks' storage only 1.9% of the $H_2O_2$ decomposed.

Example 3

An aqueous extract analogous to that of Example 2 but containing 20.0 g. $H_2O_2$ per 100 cc. was concentrated in the same manner again using a reflux ratio of 0.41. In this instance 53% of the original volume of the solution was driven off at the head of the dephlegmator of the first step with entrainment of 3.3% of the original $H_2O_2$. A pure product of 76% by weight of $H_2O_2$ in 17% of the volume of the original solution corresponding to a 90% yield was recovered from the rectification column. The condensate obtained from the vapors passing over the head of the rectification column was 30% of the original volume and contained 5% of the original $H_2O_2$. 1% of the original $H_2O_2$ remained in the residue of the total vaporization. The volume of such residue was about 0.25 of the original volume. The total yield of the distillation was over 99%. The concentrated product which was recovered was colorless and odorless. Practically all of the organic compounds and also the inorganic compounds derived from the apparatus were removed. The aqueous extract employed as the starting solution contained several mg. per liter of iron and aluminum and 1500–2000 mg. per liter of organic substances consisting of the organic solvents and their oxidation products, as well as substances derived from the anthraquinone. As an average, the purified and concentrated product contained 0.3 mg. per liter of iron and aluminum and 100–200 mg. per liter of organic substances so that an 80–90% purification had been effected.

Example 4

An aqueous extract containing 4.9 g. $H_2O_2$ per 100 cc. from the anthraquinone process was concentrated in the same manner as in Examples 2 and 3 except that the reflux ratio was adjusted to be 0.45. 50% of the original volume of the extract was stripped off in the first step.

1.5% of the H₂O₂ was entrained thereby. 13.5% of the original volume of the extract was obtained as a 30% by weight pure H₂O₂ from the rectification column with a 97.8% yield. 36.5% of the original extract volume was recovered as a condensate containing traces of H₂O₂ from the vapors passing over the head of the rectification column. The total yield was almost 100%. The 30% by weight product met all of the requirements of a commercial product.

According to the described manner, in column 13 about 70 to 90% of the total quantity of the hydrogen peroxide solution supplied to the column are evaporated, whilst the rest thereof overflows and combines with reflux from column 15 and is withdrawn through conduit 19 to be passed to the total evaporator 111.

I claim:

1. A process for the concentration and purification of dilute aqueous hydrogen peroxide solutions which comprises partially vaporizing a dilute aqueous hydrogen peroxide solution in a first step, passing the vapors countercurrently to an aqueous hydrogen peroxide solution of about the same concentration as the hydrogen peroxide vaporized in said first step in a dephlegmator to produce a more concentrated hydrogen peroxide solution, totally vaporizing such more concentrated solution once in a separate heating tube, directly passing the thus obtained vapors through a rectification column and cooling the head of such rectifying column fractionally to condense a still more concentrated hydrogen peroxide.

2. The process of claim 1 in which said dilute aqueous hydrogen peroxide solution contains 35 to 45% by weight of hydrogen peroxide.

3. The process of claim 1 in which the dilute aqueous hydrogen peroxide passed countercurrently to the vapors in the dephlegmator is a portion of the solution to be concentrated and purified.

4. The process of claim 1 in which the quantity of dilute aqueous hydrogen peroxide passed countercurrently to the vapors in the dephlegmator is such as to provide a reflux ratio between 0.25 and 1.5.

5. The process of claim 1 in which the total vaporization of the more concentrated hydrogen peroxide solution is carried out in an evaporator constructed of tantalum having an anodically oxidized surface.

References Cited in the file of this patent

UNITED STATES PATENTS

| | | |
|---|---|---|
| 1,511,494 | Baum | Oct. 14, 1924 |
| 2,224,835 | Reichert et al. | Dec. 10, 1940 |
| 2,491,732 | Hawkinson et al. | Dec. 20, 1949 |
| 2,751,339 | Inman | June 19, 1956 |

FOREIGN PATENTS

| | | |
|---|---|---|
| 519,276 | Great Britain | Mar. 20, 1940 |
| 468,117 | Canada | Sept. 12, 1950 |